(12) United States Patent
Clarysse et al.

(10) Patent No.: US 12,123,741 B2
(45) Date of Patent: Oct. 22, 2024

(54) SUPPLEMENTING ELECTRONIC MAP DATA FROM USER BEHAVIOR

(71) Applicant: TomTom Global Content B.V., Amsterdam (NL)

(72) Inventors: Pascal Clarysse, Koksijde (BE); Nick Cremelie, Ghent (BE); Tim Bekaert, Kluisbergen (BE); Koen Verheyen, Oudenaarde (BE); Erwin Perremans, Wichelen (BE); Hans Verheyden, Ghent (BE)

(73) Assignee: TomTom Global Content B.V., Amsterdam (NL)

( * ) Notice: Subject to any disclaimer, the term of this patent is extended or adjusted under 35 U.S.C. 154(b) by 306 days.

(21) Appl. No.: 17/613,744

(22) PCT Filed: May 25, 2020

(86) PCT No.: PCT/EP2020/064406
§ 371 (c)(1),
(2) Date: Nov. 23, 2021

(87) PCT Pub. No.: WO2020/239672
PCT Pub. Date: Dec. 3, 2020

(65) Prior Publication Data
US 2022/0236077 A1 Jul. 28, 2022

(30) Foreign Application Priority Data
May 24, 2019 (GB) ...................................... 1907342

(51) Int. Cl.
*G01C 21/00* (2006.01)
*G06N 3/04* (2023.01)

(52) U.S. Cl.
CPC ..... *G01C 21/3841* (2020.08); *G01C 21/3878* (2020.08); *G01C 21/3896* (2020.08); *G06N 3/04* (2013.01)

(58) Field of Classification Search
CPC ............ G01C 21/3841; G01C 21/3878; G01C 21/3896; G01C 21/3626; G01C 21/30;
(Continued)

(56) References Cited

U.S. PATENT DOCUMENTS 11,361,782 B2 * 6/2022 Ninomiya ............... G10L 25/18
2009/0138497 A1 5/2009 Zavoli et al.
(Continued)

FOREIGN PATENT DOCUMENTS

CN 104111073 A 10/2014
GB 2550803 A 11/2017
(Continued)

OTHER PUBLICATIONS

Search Report dated Oct. 31, 2019 for United Kingdom patent application No. 1907342.8.
(Continued)

*Primary Examiner* — Russell Frejd
*Assistant Examiner* — Ana D Thomas
(74) *Attorney, Agent, or Firm* — Park, Vaughan, Fleming & Dowler LLP

(57) ABSTRACT

There is provided a method for identifying possible errors/inconsistencies within an electronic map representation of a network of navigable elements within a geographic area, the method comprising: obtaining at a server positional data relating to the movement over time of a plurality of devices travelling around the navigable network; processing the obtained positional data at the server with reference to the electronic map representing the navigable network in order to identify potential inconsistencies in the map in the form
(Continued)

of one or more locations within the navigable network where an observed behaviour of devices travelling around the navigable network as indicated by the obtained positional data is not consistent with a behaviour that would be expected based on the electronic map. This information may then be relayed to navigation devices for supplementing the electronic map when generating navigation instructions.

20 Claims, 7 Drawing Sheets

(58) Field of Classification Search
CPC ........ G01C 21/20; G06N 3/04; G06F 18/217; G06F 16/29; G08G 1/0112; G08G 1/0129
See application file for complete search history.

(56) References Cited

U.S. PATENT DOCUMENTS

| | | |
|---|---|---|
| 2013/0096829 A1 | 4/2013 | Kato et al. |
| 2013/0103293 A1 | 4/2013 | Ma et al. |
| 2013/0151088 A1 | 6/2013 | Ricci |
| 2014/0143184 A1 | 5/2014 | Koukoumidis et al. |
| 2014/0278055 A1 | 9/2014 | Wang et al. |
| 2015/0134233 A1 | 5/2015 | Wolf |
| 2015/0253141 A1* | 9/2015 | Kesting ................. G01C 21/30 701/409 |
| 2017/0352262 A1 | 12/2017 | Xu et al. |
| 2018/0224285 A1 | 8/2018 | Stajner et al. |
| 2018/0335307 A1 | 11/2018 | Chen et al. |
| 2019/0137289 A1 | 5/2019 | Annamalai et al. |
| 2019/0303759 A1* | 10/2019 | Farabet .................... G05D 1/00 |

FOREIGN PATENT DOCUMENTS

| | | |
|---|---|---|
| WO | 2015104383 A1 | 7/2015 |
| WO | 2017129586 A1 | 8/2017 |
| WO | 2017212639 A1 | 12/2017 |
| WO | 2018024703 A1 | 2/2018 |

OTHER PUBLICATIONS

International Search Report dated Mar. 12, 2020 for International patent application No. PCT/EP2020/064406.

* cited by examiner

SUPPLEMENTING ELECTRONIC MAP DATA FROM USER BEHAVIOR

CROSS-REFERENCE TO RELATED APPLICATIONS

The present application is a National Stage of International Application No. PCT/EP2020/064406, filed on May 25, 2020, and designating the United States, which claims benefit to United Kingdom Patent Application 1907342.8 filed on May 24, 2019. The entire content of these applications is incorporated herein by reference.

FIELD OF THE INVENTION

The present invention relates generally to methods for providing navigation guidance for use in guiding a device through a navigable network covered by an electronic map, and in particular to methods for improving, or supplementing, map data for use in such contexts. In particular, the present invention provides methods for identifying potential errors and other inconsistencies within the map based on the observed behaviour of devices travelling throughout the navigable network. In embodiments, this information is then relayed to a device in order to improve the quality of navigation guidance provided by the device. Also provided are corresponding systems, and software products.

BACKGROUND

Map data for electronic navigation devices, such as GPS based personal navigation devices whether provided as a dedicated navigation system like the TomTom GO™ Sat Nav system, navigation software running on a smartphone application, or an in-vehicle navigation system typically comes from specialist map service providers such as Tom-Tom International BV. This electronic map data is specially designed to be used by route guidance algorithms, typically in combination with location data from the GPS system, in order to plan an optimal route for the navigation device to travel through a navigable network to a desired destination.

An electronic map is thus a digital representation of a real-world navigable (e.g. road) network. For example, road segments can be described as lines—i.e. vectors (e.g. start point, end point, direction for a road)—with a road then being made up of multiple of such segments, each uniquely defined, e.g., by start point/end point direction parameters.

An electronic map is then typically comprised of a set of such road segments, along with data associated with each segment (speed limit; travel direction, etc.), plus any points of interest (POIs), road names, other geographic features like park boundaries, river boundaries, etc., which may also be defined within the map.

All of the features of the map (e.g. road segments, POIs, etc.) are preferably defined in a co-ordinate system that corresponds with or relates to the GPS co-ordinate system, enabling a device's location as determined through a GPS system to be mapped onto the corresponding road segment as defined in the map.

Navigation instructions for guiding a user along a predetermined route can thus be provided using such an electronic map by matching the (current) position of a device to the map, and then providing relevant navigation instructions as the device approaches various intersections, or other decision points, within the navigable network. For example, the navigation guidance may comprise an instruction such as "Turn left at the next junction".

An important element for improving the user experience, and ensuring user safety, is that the navigation device when generating such navigation instructions does not instruct a user to perform an operation that is not in fact permitted (or not possible). Thus, it is important that the electronic map data is reliable and accurately reflects any, e.g., driving restrictions within the network.

To construct an electronic map, basic road information can be obtained from various sources, such as the Ordnance Survey for roads in England. Map service providers also typically have a large dedicated fleet of vehicles driving on roads, as well as personnel checking other maps and aerial (satellite) photographs, to update and check its data. This data constitutes the core of the map database and the map database is continuously being enhanced with new georeferenced data.

The map data in the database is then checked and published periodically (e.g., as a map update release) for updating a current version of the map for use by navigation devices, software, systems, and so on.

In addition to the on-going improvements described above, end-users can directly report map errors, e.g. via a suitable web interface. Navigation device manufacturers also capture and forward map error reports from their users in this way. However, these error reports are often provided in a free text format, so that considerable effort still has to be expended by the map service provider in identifying the nature and the exact location of the error before it can be included into a future map release.

Thus, despite the considerable resources that go into updating and verifying these electronic maps, there can still be a significant delay in bringing map updates to the market, and map data at least for some geographic areas may still be unreliable and/or significantly out of date.

Accordingly, it is desired to provide improved techniques for identifying possible map errors and other inconsistences within an electronic map for use when providing navigation guidance.

SUMMARY OF INVENTION

According to a first aspect of the present invention there is provided a method for providing navigation guidance for a device travelling within a navigable network represented by an electronic map, the method comprising:

obtaining at a server positional data relating to the movement over time of a plurality of devices travelling around the navigable network;

processing the obtained positional data at the server with reference to the electronic map in order to identify potential inconsistencies in the map in the form of one or more locations within the navigable network where an observed behaviour of devices travelling around the navigable network as indicated by the obtained positional data is not consistent with a behaviour that would be expected based on the electronic map;

providing supplemental map information indicative of any potential inconsistencies identified in the map for output to a navigation device; and the navigation device then using the provided supplemental map information along with its current version of the electronic map when generating a set of navigation instructions for guiding the device through the navigable network.

Navigation instructions for guiding a device around a real-world navigable (e.g. road) network are normally provided by reference to an electronic map that provides a virtual representation of the network. For instance, a navigation service will typically obtain a current location from the device and then match this location onto the map in order to determine where the device is located within the network, and generate instructions accordingly. An important element for improving the user experience, and for safety, is thus to ensure that the instructions are in fact consistent with the real network geometry, and the actual behaviour of users of the network, to avoid instructing the device user to perform a manoeuvre that is either not possible (or at least not permitted), or somehow undesirable.

This requires reliable map data. However, there may be various errors or inaccuracies within the map data. Further, the network may change frequently, whereas map updates can be relatively slow. For instance, conventionally, even when a possible map error (e.g. a missing driving restriction) is identified and reported to the map service provider, an update of the map is not provided until the map service provider has validated the location and type of error.

This validation step typically involves checking the error with a secondary source of information. However, this information may not be immediately available. For example, validation might typically involve sending a dedicated vehicle to the reported location in order to image that locale with the images then being processed at the map service provider to ascertain the precise nature of the error (e.g. to distinguish between different possible driving restrictions). Thus, presently, it can take months, or even years, before a new map update is released in which the error is addressed. During this period, any navigation services using the electronic map may therefore risk generating inaccurate instructions.

Additionally, no account is typically taken of other possible inconsistencies in the map that may be reflective of, e.g., a local preference, or the incentive for taking a particular route, rather than any actual (physical or legal) travel restrictions. However, this information would also desirably be taken into account when providing navigation guidance in order to improve the overall end user experience.

The present invention thus recognises that it may be more desirable to be able to flag possible errors in the electronic map such as missing (e.g. and/or recently changed) or erroneous driving restrictions, and/or other potential inconsistencies in the map, to the navigation device relatively earlier, e.g. without waiting for the error to be validated and released in a new map update. That is, at least from the end-user perspective, it is more important to know that there is some restriction in place (or that a restriction is not in fact present, or has been removed, etc.), and for the navigation device to be able to take this into account, but the user may not particularly care what the restriction is. In other words, from the end-user perspective, it is only important to receive clear navigation instructions to allow the user to follow a route to reach their desired destination, and it does not matter why a particular road along the route may (or may not) be restricted, so long as the navigation device does not guide the user along a potentially impermissible or otherwise undesirable route. (By contrast, the map service provider is more concerned with making the map as accurate as possible. There are thus competing requirements between the interests of the map service provider and the end-users of the map service.)

The present invention thus further recognises that it is possible to identify possible errors in the map based (solely) on observations of the behaviour of devices travelling within the navigable network. The observed end-user behaviour can thus be used to identify possible errors in the map, and this "supplemental" map information can then be provided at this point, e.g. to a navigation device (without having to wait for the map to be updated) and used together with the current version of the map to which that navigation device has access to allow the navigation device to provide improved (e.g. more reliable) navigation instructions. For instance, the supplemental map information can be stored separately from the electronic map, and thus provided to the navigation device separately from the map data, preferably relatively more frequently than the map updates. The supplemental map information can therefore bridge the current gap between real-time information (such as traffic information) and global map updates.

Furthermore, it is also possible to identify from the observed behaviour any other instances where the user behaviour does not match (i.e. is inconsistent with) the expected behaviour according to the map. For example, as well as physical or legal driving restrictions, such inconsistencies may reflect local driving preferences. That is, even where no actual driving restriction is in place, a particular manoeuvre may still be otherwise undesirable such that in practice no (or very few) users actually perform that manoeuvre. In that case, it would also be beneficial for the navigation guidance to account for this, e.g. and to preferentially not guide users along such routes. This is of course especially pertinent since users of navigation systems are typically unfamiliar with the network within which they are travelling and causing them to perform an undesirable, or difficult, manoeuvre may cause significant stress. Thus, when a potentially more desirable alternative route (e.g. as inferred from the observed behaviour) is available, it may be beneficial to preferentially guide users along that route, even if this is associated with a greater travel time.

Thus, from the observed behaviour as obtained from the positional data for devices travelling within the network, it is possible to identify and hence account for any potential inconsistencies between the map data and the actual conditions in the network, regardless of the nature of these inconsistencies, i.e. whether they reflect actual physical or legal restrictions in the network, or merely reflect local preferences/incentives. Any such inconsistencies can then be provided to the device as supplemental map information.

The inconsistencies that may be identified in the map thus generally take the form of one or more locations in the navigable network (with the locations preferably being defined relative to the map), where it has been determined that the observed behaviour does not match, i.e. is potentially inconsistent with, the expected behaviour based on the map. The inconsistencies may thus be reflective of any missing, superfluous, or otherwise incorrectly mapped, travel restrictions, but also of any local preferences that might also influence the user behaviour.

In embodiments, the inconsistencies may also be time dependent. For instance, it may be that a certain travel restriction is in place only on weekdays, or only at rush-hour. Similarly, local preference may vary depending on the typical travel conditions such that a manoeuvre that is undesirable during rush hour may be more acceptable during off peak travel times. Thus, the inconsistencies may also be associated with one or more respective time slot(s). For instance, the obtained positional data is typically associated with a timestamp. By suitably processing the positional data for each time slot (e.g. by first binning the data according into a respective time slot, and the processing the data for each time slot to identify any potential inconsistencies in the map within that time slot) it is thus possible to identify instances where the observed behaviour at a particular time (slot) does not match the behaviour that would be expected based on the map, and to include this into the supplemental map data accordingly. In embodiments, the classification algorithm may naturally take this temporal information into account. For example, where a neural network is used, as described further below, the training data used to train the neural network may also include temporal information (e.g. time stamps for the positional data).

The supplemental map data may thus be time dependent data. For instance, when generating navigation instructions at a particular time, the supplemental map data associated with that time slot can then be used in combination with the map.

According to the present invention the supplemental map information indicative of such identified inconsistencies can thus exist separately from the map data (i.e. separately from the current version of the map that is accessible by the navigation device), and is effectively used to supplement the information currently stored in the electronic map when providing navigation guidance (i.e. at least until a new electronic map is released that has been updated to include the restrictions). However, the supplemental map information preferably does not persist on the electronic map. In other words, rather than simply attempting to update the map data when a possible error is identified (although this may also be done), and to incorporate this information into a map update release, which may take significant time, separate supplemental map information is preferably provided to the navigation device. The navigation device can then use this information in order to improve the quality of the navigation guidance whilst it is waiting for a possible error to be validated and incorporated into a map update. Furthermore, information relating to local preferences can also be accounted for in this way, which would not normally be the case (for example: where local preferences means that a certain manoeuvre is strongly disincentivised but there is no actual driving restriction in place, even if this were to be reported to the map service provider as an 'error', the map service provider would then attempt to validate this and determine that there is no error, and so this information would not then be incorporated into the map in any way).

Thus, in embodiments, greater information can be provided to the navigation device, and used thereby when generating navigation instructions, relatively earlier than would conventionally be the case, e.g. where this information was being incorporated into the map only by the map service provider by way of periodic map updates. The user experience can thus be significantly improved.

The present invention recognises that the actual (observed) user behaviour within a navigable network, i.e. as may be inferred from positional data relating to the movement over time of a plurality of devices along the navigable network, can by itself be used to identify possible map errors and/or other inconsistencies wherein the user behaviour deviates from the behaviour that would be expected according to the map (albeit without necessarily being able to identify the cause of the deviation, i.e. the type of restriction). Further, this information can be provided for use by a navigation device preferably without waiting for it to be validated by a map service provider. The navigation device is thus able to use this information to supplement the current version of the electronic map when generating navigation instructions.

In turn, in order to reduce the occurrences of false positives, this may necessitate more robust methods for identifying possible map errors and/or other such inconsistencies based on the obtained positional data. Thus, as part of this, embodiments of the present invention comprise using (and generating) a suitably trained classification algorithm for identifying instances where the observed behaviour of devices travelling around the navigable network does not match the expected behaviour according to the map, and hence to identify possible errors in the map such as missing driving restrictions, and the like. For example, in preferred embodiments, the classification algorithm may comprise a deep-learning neural network that has been trained to be able to, in response to an input set of positional data, identify locations in the navigable network where the behaviour does not match the behaviour that would be expected based on the map.

In particular, the algorithm may be trained in a supervised manner using historic positional data as input training data and using the current (or a previous) version of the electronic map as the 'ground truth' for training the output of the algorithm (since it can be assumed that the map will be largely correct, with relatively few errors). It will be appreciated that this is particularly advantageous since a huge amount of suitable such data may already be available that can be used for training the classification algorithm, and so an algorithm trained in this way may be particularly robust.

The algorithm can thus be trained to "learn" what the user behaviour should look like at an intersection (and indeed at any/all intersections) within the navigable network, and thus identify instances where the current user behaviour does not match the expected behaviour according to the current map. These instances can then be flagged accordingly, e.g. with information indicative of this being provided as the supplemental map information.

In this way, the algorithm is able to identify possible map errors such as missing or otherwise incorrectly mapped driving restrictions, as well as any other possible inconsistencies in the map. For instance, the algorithm also naturally learns the expected behaviour, or driver incentives, throughout the navigable network, since this will inherently be incorporated into the algorithm during the training with the historic positional data. The algorithm is thus able to identify any inconsistencies between the observed and expected behaviour in the navigable network, e.g. and is not limited to identifying hard driving restrictions.

Also, because the algorithm is preferably trained using historic data for the whole of the navigable network (or at least for a certain region of the network, e.g. rather than merely looking at forward and backward probe counts on a single road element), the algorithm is able to process the user behaviour in a more holistic manner. The user behaviour can thus be examined in the context of a wider region of the navigable network. For instance, the classification algorithm is by its nature able to take into account the influence of a particular driving restriction throughout a region of the network, rather than simply on the immediately adjacent road segments.

It will be appreciated that the classification algorithm may thus be able to identify map errors resulting from a range of different types of driving restrictions, for instance, blocked passages, prohibited manoeuvres, implicit turns, overpasses, underpasses, superfluous or non-existent roads, and the like, and not purely one-way streets, or road closures. Furthermore, because the algorithm is trained based on user behaviour, it is possible to provide additional information, e.g. identifying other locations where the behaviour does not match the expected behaviour for the map, e.g. due to local driving preferences influencing which route(s) should preferably be followed, but which are not normally accounted for in the map (since they do not relate to real legal or physical driving restrictions). These instances can also then be identified as possible errors/inconsistencies and provided as part of the supplemental map information to the navigation device for use thereby when generating navigation instructions.

However, other arrangements would of course be possible. For instance, rather than using a trained classification algorithm such as a neural network of the preferred type described above, a relatively simpler rubric may be used, e.g. that defines a probabilistic threshold based on the positional data such that, for example, where there are two possible options for users, and a certain threshold number (or sequence) of users perform in the same way (with no, or relatively few (e.g. below the threshold), users taking the other option), it is determined that there is an error/inconsistency in the map.

In any case, it can be identified from the user behaviour (as determined from the positional data) that something has changed or might be incorrectly mapped, even if it is not (yet) possible to know exactly what has caused the change in behaviour. However, this information can thus be determined from the user behaviour and provided back to the navigation device(s) at that point without waiting for confirmation as to the nature of the driving restriction. In this way, the navigation device is able to act on such errors relatively earlier than would conventionally be the case.

The present invention also extends to a system for performing such methods. Thus, from a second aspect there is provided a system for providing navigation guidance to a device travelling within a navigable network represented by an electronic map, the system comprising:
  a server that is configured to obtain positional data relating to the movement over time of a plurality of devices travelling around the navigable network, to process the obtained positional data with reference to the electronic map in order to identify potential inconsistencies in the map in the form of one or more locations within the navigable network where an observed behaviour of devices travelling around the navigable network as indicated by the obtained positional data is not consistent with a behaviour that would be expected based on the electronic map; and to provide supplemental map information indicative of any potential inconsistencies identified in the map for output to a navigation device; and
  a navigation device that is configured to obtain the supplemental map information from the server, and to then use this information along with its current version of the electronic map in order to generate a set of navigation instructions for guiding the device through the navigable network.

This second aspect of the present invention can and preferably does include any one or more or all of the preferred and optional features of the invention described herein in respect of the first aspect in any of its embodiments, as appropriate. For example, even if not explicitly stated, the system may, and in embodiments does, comprise means for carrying out any step or steps described in relation to the method herein in any of its aspects or embodiments, and vice versa.

The means for carrying out any of the steps described in relation to the method or apparatus may comprise a set of one or more processor(s) and/or suitable processing circuits or circuitry. The present invention is therefore preferably a computer implemented invention, and any of the steps described in relation to any of the aspects or embodiments of the invention may be carried out under the control of a set of one or more processor(s) and/or suitable processing circuits/circuitry. The processing circuits/circuitry may generally be implemented either in hardware or software, as desired. For instance, and without limitation, the means or processing circuits/circuitry for carrying out any of the steps described herein in relation to the method or system of the present invention may comprise one or more suitable processor or processors, controller or controllers, functional units, circuits/circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

At least of the steps may be carried out locally at the device, e.g. using one or more processor(s) associated with the device. However, other of the steps may be performed remotely from the device, e.g. at a server. It will be appreciated that as used herein a "server" may generally refer to a set of cluster of one or more server(s). In particular, it will be understood that a server need not be a (single) physical data server but may comprise a virtual server, e.g., running a cloud computing environment. That is, at least some of the processing steps may be performed on a cloud server. Various other arrangements would of course be possible.

The present invention may be implemented in relation to navigable elements of any type. Preferably the navigable elements are road elements (of a road network), but it will be appreciated that the techniques are applicable to any type of road element, or indeed other type of navigable element, where appropriate positional data exists or can be determined. Implementation in relation to road networks is particularly advantageous; as such data is most likely to already be in existence. That is, there may already be a relatively large database of historic positional data that can be used for determining the expected user behaviour within the network, and/or for training a classification algorithm, and thus for identifying possible map errors/inconsistencies. However, while exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. Similarly, any reference to a driving restriction can in embodiments refer to any travel restriction, depending on the navigable network being considered. The present invention is therefore applicable to detecting possible errors/inconsistencies in electronic maps representing any suitable navigable network for which positional data can be obtained.

The method involves obtaining and using positional information relating to the movement of devices with respect to time along the navigable network. The positional data may then be used to examine the user behaviour around the navigable network. The observed user behaviour in turn is used to identify possible errors/inconsistencies within an electronic map representation of the navigable network. In particular, the observed user behaviour in the vicinity of (or at) an intersection defined within the electronic map can be compared with the expected behaviour at that intersection based on the current version of the map. The positional data may be obtained for a particular intersection, and used to examine the user behaviour at the intersection, e.g. identify a possible map error/inconsistency relating to that intersection. For instance, the intersection may be a junction, or a possible turning point defined within the electronic map.

However, preferably, positional data is obtained and processed for substantially the whole navigable network (or at least a relatively large region of the network, e.g. representing a city, or a district), e.g. so as to identify in essentially a single step any instances (i.e. locations) where the observed behaviour deviates from the expected behaviour. This is facilitated in preferred embodiments through the use of a deep learning neural network that is trained to process input positional data for substantially the whole navigable network and to identify for output any instances where the observed behaviour as inferred from the input positional data does not match the expected behaviour for the map (i.e. any potential inconsistencies in the map). In this way, the identification is able to take into account the full context of the user behaviour within the network.

The positional data used in accordance with the invention is positional data relating to the movement of a plurality of devices along the navigable network. The method may comprise obtaining positional data relating to the movement of a plurality of devices in a geographic region including the navigable network, and then filtering the positional data to obtain positional data relating to the movement of the plurality of devices along navigable elements of the navigable network. The step of obtaining the positional data relating to the movement of devices along the navigable network may thus be carried out by reference to the electronic map representing the navigable network. In other words, in accordance with the invention in any of its aspects or embodiments, the method preferably comprises attempting to match the positional data received from each of the plurality of devices to a position on a segment of one of a plurality of navigable segments of an electronic map representing the network of navigable elements. This process may be referred to as "map matching", and may involve the use of various algorithms as known in the art. The method may comprise attempting to match each item of positional data to a position along one of the navigable segments of the digital map. In carrying out this map matching process, a map matching error indicative of a difference between a position indicated by the positional data, and the position on the navigable segment to which it is matched, may be derived in respect of each item of positional data. In embodiments, for each of the plurality of devices, the method may comprise attempting to match each positional data point to a position on a navigable segment of the digital map. A map matching error may be determined for each data point. Such a map matching error may arise for various reasons, such as, for example, general noise in the positional data signals and/or mapping errors, e.g. where a reference line of a navigable element is not correctly geo-referenced in the map such that the position of the navigable element represented by a segment of the electronic map does not precisely correspond to the actual position of the element in reality. Where a difference between a position indicated by the positional data and the closest position along a navigable segment of the map exceeds a given threshold, it may be determined that the position of the device cannot be matched to a navigable segment of the digital map. This may be the case where, for example, the course of a navigable element in reality has changed from that recorded in the digital map data.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along an alternative navigable element at a node in accordance with the present invention. However, in preferred embodiments all positional data is associated with temporal data, e.g. a timestamp. In this way it is possible for the positional data to be processed to account for temporal variations in the travel conditions within the navigable network.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from Wi-Fi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information typically (although not necessarily) at regular intervals. Such devices may include navigation devices, mobile telecommunications devices with positioning capability, position sensors, etc.

Preferably the (or each) device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein.

The method of the present invention may involve obtaining and using "live" positional data relating to the movement of a plurality of devices with respect to time along the navigable network, in order to determine current map errors/inconsistencies. Live data may be thought of as data which is relatively current and provides an indication of relatively current conditions on each alternative navigable element. The live data may typically relate to the conditions on the elements within the last 30 minutes, 15 minutes, 10 minutes or 5 minutes. By using live positional data in determining possible map errors/inconsistencies, it may be assumed that the information determined is currently applicable, and may be applicable in the future, at least in the shorter term. The use of live positional data allows accurate and up to date closure information to be determined, that can be relied upon by road users and/or navigation devices or ADAS. However, more typically, the method of the present invention will involve processing relatively older data, e.g. over a period of a few days or weeks.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The obtained positional data for the plurality of devices is then processed to identify possible map errors/inconsistencies and/or other instances where a behaviour as inferred from the obtained positional data deviates from the expected behaviour based on the map. In particular, the positional data may be processed to identify missing, or superfluous, or otherwise incorrectly mapped, driving restrictions within the electronic map. For example, the obtained positional data can be used to identify intersections within the electronic map for which there is a driving restriction prohibiting users from performing a certain action, but which restriction is not defined within the electronic map. More generally, it can be inferred from the obtained positional data any locations where the actual (observed) behaviour does not match the behaviour that might be expected based on the map, and to identify such inconsistencies accordingly.

For instance, the positional data is obtained from end users and thus allows the behaviour of the users within the navigable network to be examined. The user behaviour at an intersection will be influenced by various legal restrictions, physical restrictions, and also local preferences. So, where the user behaviour at an intersection (or, more generally, at any location within the navigable network) does not match the expected behaviour based on the current information on the map, it can thereby be identified that there is a possible error in the map, or that further information may need to be added into the map to better reflect the actual user behaviour, and this information can then be collated, e.g. and provided back to the navigation devices for use thereby when generating navigation guidance. For example, in this way, it is possible to identify specific manoeuvres that should be restricted (either due to a physical restriction, or some local preference i.e. a disincentive to perform such manoeuvres), and this information can be provided to the navigation device as supplemental map information for supplementing the electronic map data when generating navigation instructions. Similarly, the present invention is able to identify specific manoeuvres that are currently restricted in the electronic map, but in fact should not be restricted, and to override the map data when generating navigation instructions. However, various other examples are of course possible and an advantage of the techniques described herein is that the user behaviour can be processed to identify any potential inconsistencies in the map, regardless of the resulting cause of the inconsistency.

For example, possible map errors that can be identified in this way may include various types of driving restriction that are missing from, or otherwise incorrectly matched to, the map. These errors may generally relate to any type of driving restriction. For instance, a driving restriction may comprise a legal restriction, such as a restricted turn, or one-way street. For example, in the case of a one-way street, the map may incorrectly include this as a normal (two-way) road, and the navigation device may therefore attempt to guide users along that road even where this is not permitted. A driving restriction may also comprise a physical restriction, such as a road closure, or a set of bollards. Another example would be an overpass (or underpass) that has been incorrectly mapped as part of a junction despite there being no physical route off the overpass. A further example would be a superfluous road, i.e. a road that is included in the map but does not in fact exist (e.g. which may occur where a sidewalk or river has been incorrectly mapped as a road). Various other examples are of course possible. These types of restrictions can be difficult to identify (e.g. from satellite data), and so may be missed during the initial map construction. Furthermore, the navigable network itself will change over time, e.g. due to road works. Conventionally, even when these errors are noticed, and reported as possible errors by end users to the map service provider, the map service provider must then confirm the exact type and location of the error. However, this is expensive in terms of both resource and time. In other words, the map maintenance is generally running behind reality. The present invention thus allows these possible errors to be flagged up relatively earlier to allow the navigation device to take this into account (without yet knowing the exact type of error).

The present invention is also able to (and preferably does) identify other instances where the observed behaviour is inconsistent with the expected behaviour, e.g. that may relate to local preferences. For example, if an element is present, but is simply too narrow for users to easily pass through, it may be that in reality a user would prefer to take an alternative route than to traverse that element even though it would in principle be possible to traverse that element. This type of driving restriction may thus be based purely on local preferences (rather than any physical or legal restriction) and is not normally accounted for at all when generating electronic maps (e.g. since the road is present, the map is not physically incorrect, but still contains an inconsistency in that when the map is used for navigation purposes it may generate undesirable instructions). However, it will be appreciated that this type of restriction based on the local preferences may be beneficial for providing navigation guidance to users, and can relatively easily be inferred from the observed user behaviour according to the techniques presented herein, especially when using a suitably trained classification algorithm. That is, embodiments of the present invention also allow for new types of information modelling the local preferences to be used in combination with the map when generating navigation instructions.

As mentioned above, the processing of the obtained positional data is preferably performed using a suitably trained classification algorithm. That is, the processing of the obtained positional data is preferably performed using machine learning techniques. In embodiments, the processing of the obtained positional data is performed using a neural network. However, other suitable classification machine learning algorithms can of course be used. The classification algorithm (e.g. neural network) is preferably trained using historic positional data obtained for the navigable network as input in combination with the (current, or an earlier version of the) electronic map which serves as 'ground truth' for training the algorithm.

Thus, in embodiments, there is provided a method of generating and/or updating a classification algorithm for identifying inconsistencies within an electronic map representing a navigable network in the form of one or more locations within the navigable network where an expected behaviour of devices travelling around the navigable network according to the electronic map is not consistent with an observed behaviour, the method comprising: providing training data in the form of a set of historic positional data obtained for devices moving throughout the navigable network; and training the classification algorithm using the historic positional data as input and using the electronic map as ground truth.

The training data thus preferably comprises a set of historical positional data representing the movement over time of a plurality of devices around the navigable network, which is used as input training data. The desired output for a given input (i.e. the 'ground truth') that is used for training the classification algorithm (e.g. neural network) is then the electronic map itself, and particularly the set of driving restrictions currently included within the map. It will be appreciated that given the resources used for constructing the map, the overall quality of the map data is good enough to train the classification algorithm (e.g. neural network) to recognise what user behaviour should look like at an intersection where a driving restriction applies. Further, by using the electronic map as 'ground truth', there may be massive amounts of historic positional data available for training the classification algorithm (e.g. neural network). The classification algorithm (e.g. neural network) is thus robust enough to deal with areas of relatively low probe density, as well as exceptional user behaviour violating the restriction, and is thus able to reduce the likelihood of false positives. In other words, the use of machine learning techniques is particularly suited to the present application since there may already be a relatively large set of available training data available (in the form of the historic positional data and the current version of the electronic map).

Based on its knowledge of the expected user behaviour, and the obtained (live) positional data, the trained classification algorithm (e.g. neural network) is thus able to identify specific manoeuvres at the intersection that should be restricted (but are not restricted in the electronic map). Correspondingly, the classification algorithm (e.g. neural network) is also able to identify specific manoeuvres that are currently restricted in the electronic map but that should not in fact be restricted.

In particular, the classification algorithm (once trained) can then be provided as input with a set of obtained positional data (which may, e.g., comprise live data) along with the current version of the map. The classification algorithm (classifier) then takes a decision using all of the input positional data (i.e. observations) and the expected behaviour from the map. Thus, the classification algorithm, which is preferably trained on the same type of data (i.e. using historic positional data), can inherently account for any deviations from the expected behaviour defined by the map, independently of the cause of the deviations. The classification algorithm then provides as output a set of instances (i.e. locations defined relative to the map) where the observed behaviour does not match the expected behaviour for the map.

Thus, in embodiments, the step of processing the obtained positional data with reference to the electronic map comprises a step of providing the obtained positional data as input to a classification algorithm that has been trained using historic positional data for devices moving throughout the navigable network and the electronic map to be able to identify inconsistencies in the map where an observed behaviour of devices travelling around the navigable network as indicated by the input positional data is not consistent with a behaviour that would be expected based on the electronic map. In other words, the classification algorithm is trained to identify inconsistencies between the map and observed behaviour as indicated based on the obtained positional data that is input to the classification algorithm. An identification of any potential inconsistencies in the map is thus received as output from the classification algorithm.

Any instances (i.e. locations in the navigable network defined within the electronic map) where the observed behaviour does not match the expected behaviour for the map can then be flagged up as a possible error/inconsistency, and included into the supplemental map information accordingly, e.g. for output to the navigation device.

However, other arrangements would of course be possible. For instance, any suitable machine learning classification algorithm may be used. Further, the training may either be supervised or unsupervised. In other cases, a relatively simpler (probabilistic) rubric may be used for identifying map errors based on the observed user behaviour.

The processing preferably also accounts for the relative incentive for a user to perform that manoeuvre. For instance, in some cases, the processing may be generally targeting the absence of positional data performing a certain manoeuvre. Thus, if there is no (or relatively low) incentive for a user to perform a manoeuvre, this manoeuvre will rarely (if ever) be performed. However, the manoeuvre may still be possible, and so the absence of positional data confirming this does not necessarily identify any error/inconsistency in the map. That is, it may be that the positional data shows very few users performing a certain action not because that action is not possible, but rather because there is only a relatively low incentive for users to perform that action. An example of this might be performing a turn onto a dead-end road, with relatively few houses (or other POIs) located along that road. In that case, it will be relatively rare that users will want to travel along that road.

To account for this, the classification algorithm (e.g. neural network) is preferably extended with features that reflect the incentive (i.e. likelihood) that a user will perform a manoeuvre. Accordingly, in embodiments, the identification accounts also for the incentive for devices to perform a certain action, and weights this accordingly when identifying map errors. For instance, if there is relatively lower incentive for devices to perform a particular manoeuvre, the method may require relatively more data to be obtained before identifying that this manoeuvre is prohibited. Correspondingly, where there is a relatively higher incentive for devices to perform a particular manoeuvre, this can also be accounted for when identifying possible inconsistencies in the map. Again, by using a suitably trained classification algorithm, the incentive can (and will) naturally be taken into account during the training of the algorithm. That is, because the algorithm is preferably trained using historic positional data, along with the map, the relative likelihoods (i.e. incentives) for users performing certain actions is an integral part of both the training of the classification algorithm, and the classification process. Thus, the use of a classification algorithm such as a neural network that has been trained using the electronic map again helps reduce the number of false positives in identifying possible map errors/inconsistencies, thus further improving the user experience.

This processing of the positional data is generally performed at a server (or set of servers such as a cloud server). That is, positional information from a plurality of devices moving within the network is provided to a remote server (or servers), which then processes the positional information in the manner described above in order to identify missing driving restrictions.

Thus, from a further aspect, there is provided a method for identifying possible errors/inconsistencies within an electronic map representation of a network of navigable elements within a geographic area, the method comprising: obtaining at a server positional data relating to the movement over time of a plurality of devices travelling around the navigable network; processing the obtained positional data at the server with reference to the electronic map representing the navigable network in order to identify potential inconsistencies in the map in the form of one or more locations within the navigable network where an observed behaviour of devices travelling around the navigable network as indicated by the obtained positional data is not consistent with a behaviour that would be expected based on the electronic map.

This method is preferably performed on a server. Thus, in embodiments, there is provided a server that is configured to obtain positional data relating to the movement over time of a plurality of devices travelling around the navigable network, to process the obtained positional data with reference to the electronic map in order to identify inconsistencies in the map in the form of one or more locations within the navigable network where an expected behaviour of devices travelling around the navigable network according to the electronic map is not consistent with an observed behaviour as indicated by the obtained positional data within the electronic map, and to provide supplemental map information indicative of any identified inconsistencies.

It will be appreciated that the processing according to these further aspects may, and preferably does, involve the steps described above in relation to embodiments of the first and second aspects. That is, preferably, the positional data is processed using a suitably trained classification algorithm such as a neural network, as described above.

The information may be provided to the map service provider. For example, the map service provider may use this information for a (pseudo) map update, i.e. to temporarily update the map to show a missing driving restriction without yet knowing the nature of the driving restriction. Similarly, the map service provider may use the information regarding the identified inconsistencies to focus mapping resource towards resolving those inconsistencies. Thus, the ability to identify possible errors/inconsistencies may itself be of benefit for the map service provider.

However, preferably, the information about any potential inconsistencies that are identified by the processing is (also) provided for output to navigation devices. That is, the method preferably comprises providing supplemental map information indicative of any identified inconsistencies for output to a navigation device. For instance, as explained above, preferably, the identified missing driving restrictions are stored and used separately from the map data. That is, preferably the supplemental map information is provided separately to the navigation device and used (only) to supplement the current version of the map, but does not persist on the map. (At least in this sense, it will be appreciated that the use of the supplemental map information is analogous to the use of live traffic information, which can also be fed into the navigation device and used thereby when providing navigation device. The supplemental map information of the present invention can therefore be considered as information that can bridge between the live traffic information and the relatively slow map updates that reflects errors in the map that may arise on intermediate timescales (and in between map updates)).

The navigation device thus preferably receives this map supplement information from the server. The navigation device also has access to an electronic map. For example, the navigation device may store a current version of the map locally, or may access the electronic map from a remote map database. The navigation device then uses the information about the missing driving restrictions in combination with its current version of the map in order to provide navigation guidance. For instance, in the usual way, the navigation device may include route planning functionality that plans a route through the navigable network to a destination, and then generates navigation instructions to guide a user of the device along that route. In that case, the route planning functionality may also take into account the supplemental map information when planning the optimal route.

Thus, the navigation device may use the supplemental map information when providing navigation guidance. For instance, the navigation guidance may simply cause any locations (e.g. turns) where a possible error/inconsistency has been identified to be avoided. However, preferably, the supplemental map information also includes a confidence value (or probability) associated with each of the identified inconsistencies, and this confidence value is also taken into account when providing navigation guidance. For example, if there is only a relatively low confidence level that a particular turn is restricted, this might be ignored if it is necessary to make that turn in order to reach a destination. Similarly, if routing away from a particular turn will result in a very large detour (with a large associated time cost), the route planning algorithm may decide to ignore the inconsistency (i.e. restriction) depending on its associated confidence level.

However, the supplemental map information may also be used for any other navigation applications using the electronic map. For example, in embodiments, the supplemental map information may be fed into an advanced driver assistance system (ADAS) or autonomous driving module. The navigation instructions may thus comprise audio/visual instructions that are displayed to a user of the device to guide the user through the navigable network, or may comprise instructions that are provided to an on-board ADAS or autonomous driving module and used thereby for navigating a vehicle. For the purposes of the present disclosure, generating instructions for an ADAS or autonomous driving module should still broadly be considered as navigation "guidance".

Thus, from a further aspect, there is provided a method of generating navigation instructions for a device travelling within a network of navigable elements within a geographic area, wherein the network of navigable elements comprises a plurality of navigable elements connected by a plurality of nodes, and wherein the navigable network is represented by an electronic map, the method comprising: accessing a stored version of the electronic map representing the navigable network; obtaining from a server supplemental map information identifying inconsistencies in the map in the form of one or more locations in the navigable network where it has been determined that an observed behaviour of devices travelling around the navigable network is not consistent with a behaviour that would be expected based on the electronic map; and using the supplemental map information when generating one or more navigation instructions for the device.

This method is typically performed by a navigation device. Thus, in embodiments, there is provided a navigation device that is configured to, when generating navigation instructions for a device travelling within a navigable network represented by an electronic map, access a stored version of the electronic map representing the navigable network; obtain from a server supplemental map information indicative of one or more locations within the navigable network where it has been determined that an observed behaviour of devices travelling around the navigable network is not consistent with a behaviour that would be expected based on the electronic map; and use the obtained supplemental map information along with the stored version of the electronic map when generating one or more navigation instructions.

The present invention thus allows driving restrictions within a navigable (e.g. road) network to be identified based on the behaviour of users of the network. That is, positional data can be obtained relating to the movement over time of the users throughout the navigable network, and this can then be used to analyse the user behaviour at one or more point(s) within the navigable network (e.g. an intersection, or other decision point), in order to identify possible driving restrictions. In particular, the positional data is preferably provided to a classification algorithm such as a neural network which has been suitably trained in order to classify the observed user behaviour in order to identify such driving restrictions. For example, the user behaviour at a particular node within the network may be influenced by legal and physical restrictions, and also local preferences. The classification algorithm is preferably trained to analyse the positional data obtained from the users of the network and identify driving restrictions at that node based (only) on the user behaviour. That is, the driving restriction can be (and preferably is) identified and provided to the navigation device without needing confirmation from a secondary source regarding the nature of the driving restriction.

Thus, compared to existing approaches wherein reported map errors must first be actively confirmed using a secondary source before they can be used by a navigation device, the present invention is able to identify driving restrictions more rapidly, such that they can also then be incorporated more rapidly into electronic map, and so on, and as such improve the overall user experience.

It will be appreciated that the methods in accordance with the present invention, in any of its aspects or embodiments, may be implemented at least partially using software. It will thus be seen that, when viewed from further aspects and in further embodiments, the present invention extends to a computer program product comprising computer readable instructions adapted to carry out any or all of the method described herein when executed on suitable data processing means (a data processor). The invention also extends to a computer software carrier comprising such software. Such a software carrier could be a physical (or non-transitory) storage medium or could be a signal such as an electronic signal over wires, an optical signal or a radio signal such as to a satellite or the like.

It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

The present invention in accordance with any of its further aspects or embodiments may include any of the features described in reference to other aspects or embodiments of the invention to the extent it is not mutually inconsistent therewith.

It should be noted that references to a location of, or a region or area associated with, etc., the device, or a location within the navigable network/map, etc., herein should be understood to refer to data indicative of these unless the context demands otherwise. The data may be in any way indicative of the relevant parameter, and may be directly or indirectly indicative thereof. Thus any reference to a location, a position, etc., may be replaced by a reference to data indicative thereof, i.e. location data, or positional data, etc. It should also be noted that the phrase "associated therewith" should not be interpreted to require any particular restriction on data storage locations. The phrase only requires that the features are identifiably related.

Various features of embodiments of the invention will be described in further detail below.

BRIEF DESCRIPTION OF DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
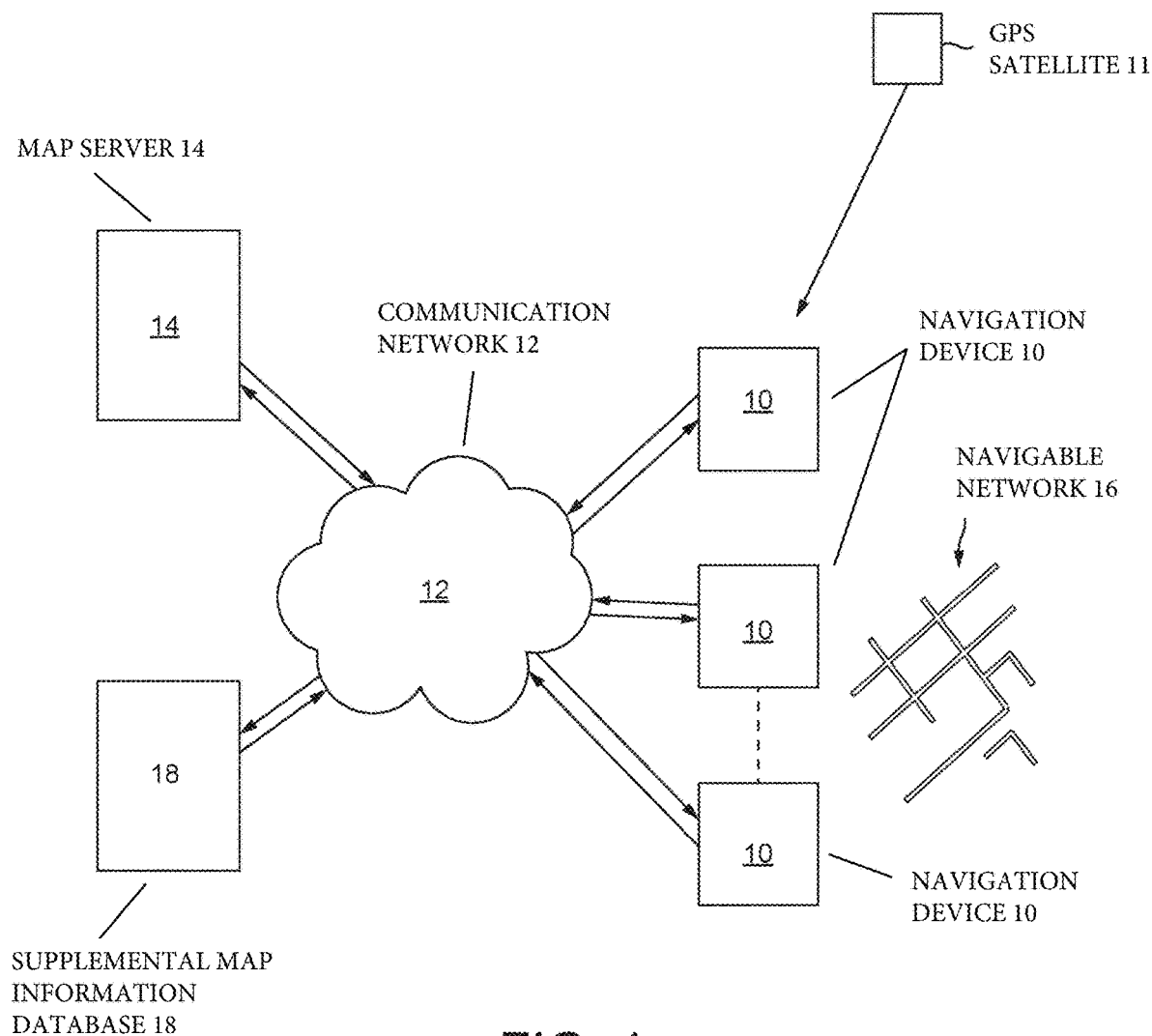
FIG. 1 shows an example of a system in which the invention may be implemented including a central server that is able to obtain and process data from a plurality of navigation devices.

Embodiments of the invention will now be described with reference to portable navigation device (PND). PNDs that include GPS (Global Positioning System) signal reception and processing functionality are well known and are widely employed as in-car or other vehicle navigation systems. In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions. The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (including e.g. famous locations, municipal locations such as sports grounds or swimming baths, and other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems, PNDs of this type may typically be mounted on the dashboard or windscreen of a vehicle, but may also be formed as part of an on-board computer of the vehicle or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

In the context of a PND, once one or more routes have been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function. Navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

However, other arrangements are of course possible. For instance, in embodiments, the PND may comprise part of an advanced driver assistance system (ADAS), or an autonomous driving module. In that case, the navigation instructions may be provided to the ADAS or autonomous driving module and be used for directly controlling the vehicle. Indeed, the present invention may be used for any suitable navigation service using an electronic map.

FIG. 1 shows an example of an overall system within which the invention may be implemented. As shown, in this embodiment there are a plurality of navigation devices (e.g. PNDs) 10 each associated with a particular vehicle (or user). Each navigation device is capable of determining its position (e.g. by receiving signals from a GPS satellite 11 or any other suitable position determining means), and the determined positions can then be used by a navigation guidance module of the device in order to provide navigation instructions to the device. For example, the navigation instructions may comprise instructions that are defined relative to an electronic map representation of a navigable network 16 within which the devices are travelling.

The navigation devices are also in communication via a suitable communication network 12 with a (remote) central server (or multiple servers such as a cloud server). In particular, the navigation devices may communicate with a map server 14 containing a map database that is periodically updated and released for use by the navigation devices 10. A traffic information database (not shown) may also be provided that is used for providing more up-to-date (real-time) updates regarding traffic conditions on the road network for use by the navigation service (in a manner that is generally known).

Further, according to embodiments of the invention, there is provided a supplemental map information database 18, that can be maintained separately from the map database, and that includes supplemental map information indicative of driving restrictions that have been identified but are missing from the current version of the electronic map. This supplemental map information can then be provided to the navigation devices 10 (optionally along with live traffic information, or any other information that may desirable be used by the navigation devices 10) in order to supplement the current version of the electronic map to improve the quality of the navigation guidance.

The supplemental map information database 18 is populated by processing positional data obtained over time from the plurality of navigation devices 10, and identifying using this positional data any instances where the observed behaviour of devices 10 within the navigable network 16 does not match the expected behaviour, i.e. based on the current version of the map.

Figure 2:
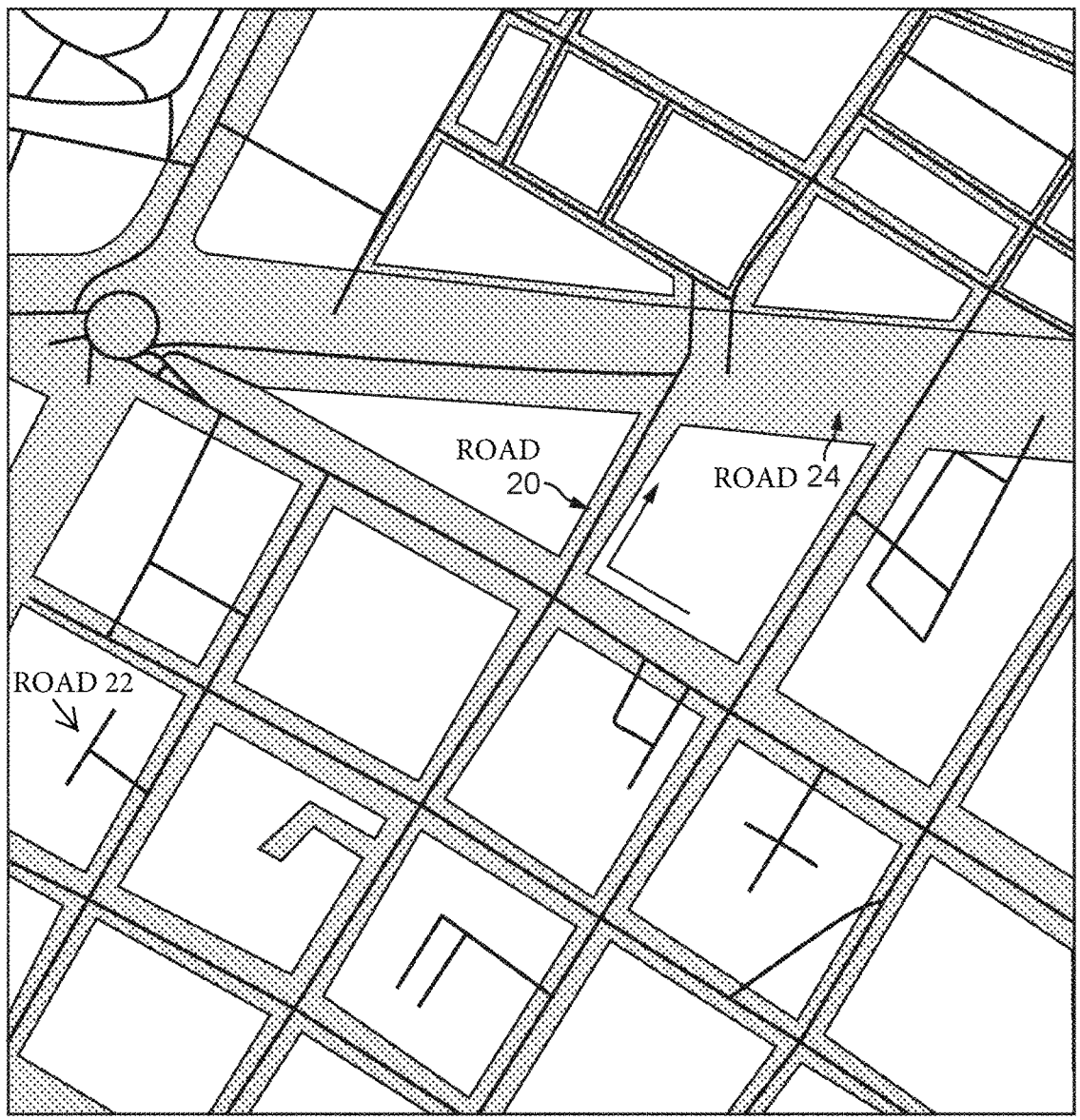
FIG. 2 shows an example of typical positional data from a plurality of devices travelling within a road network covered by an electronic map that may be obtained using the system of FIG. 1.

FIG. 2 shows a heat map derived from the GPS traces for a plurality of navigation devices 10, which shows both the density of devices moving along a certain road and the direction in which they are travelling. This heat map is overlaid onto the electronic map representation of the navigable network 16. For instance, the heat map shows that there is a high traffic density on road 24. On the other hand, there is relatively little traffic on the road 22.

The arrow represents a map error that has been identified based on the observed user behaviour. In particular, the arrow represents an unlikely turn, i.e. where it has been determined that a vehicle is unable or unlikely to be able to turn right at that location (despite this apparently being permitted based on the current map). For example, here, the positional data indicates that all of the devices travelling along the road 20 are travelling in the same direction (i.e. against the direction of the arrow), whereas the map allows travelling in both directions. This suggests that the road 20 is in fact a one-way street, despite this not being reflected in the current map. The GPS traces, reflecting the actual driver behaviour, thus trigger the identification of the unlikely turn, and this can then be included into the supplemental map information database 18 and then provided back to the navigation devices 10 and then excluded from future navigation instructions.

It will be appreciated that the user behaviour can shed light of any potential inconsistencies in the map and is not limited to hard physical or legal restrictions, such as the example shown in FIG. 2. For instance, in general, the user behaviour may be used to identify any potential inconsistencies that may reflect any (or all) of missing driving restrictions, superfluous driving restrictions, incorrectly mapped roads/restrictions, incorrectly mapped time dependent restrictions, and so on, as well as local preferences which may also influence the user behaviour.

The present invention thus uses the observed user behaviour in order to identify possible map errors/inconsistencies such as missing driving restrictions, as well as any other instances where the observed behaviour does not match the expected behaviour as defined by the map. In particular, in embodiments, a deep learning neural network may be used for processing the positional data obtained from the navigation devices 10 in order to identify any such inconsistencies in the map.

It will be understood that a neural network comprises a plurality of nodes connected by various edges. For instance, a neural network generally comprises a number of layers which each process an input data array to provide an output data array (which becomes the input data array for the next layer). The layers, acting one after the other, may be able to process complex data (e.g. positional data from a plurality of devices travelling within a navigable network) to ultimately provide a desired output (e.g. an identification of an error within an electronic map representation of the navigable network inferred from the input positional data). This process is usually known as "classification". Thus, a neural network is an example of a classification algorithm. However, various other classification algorithms are known.

Figure 3:
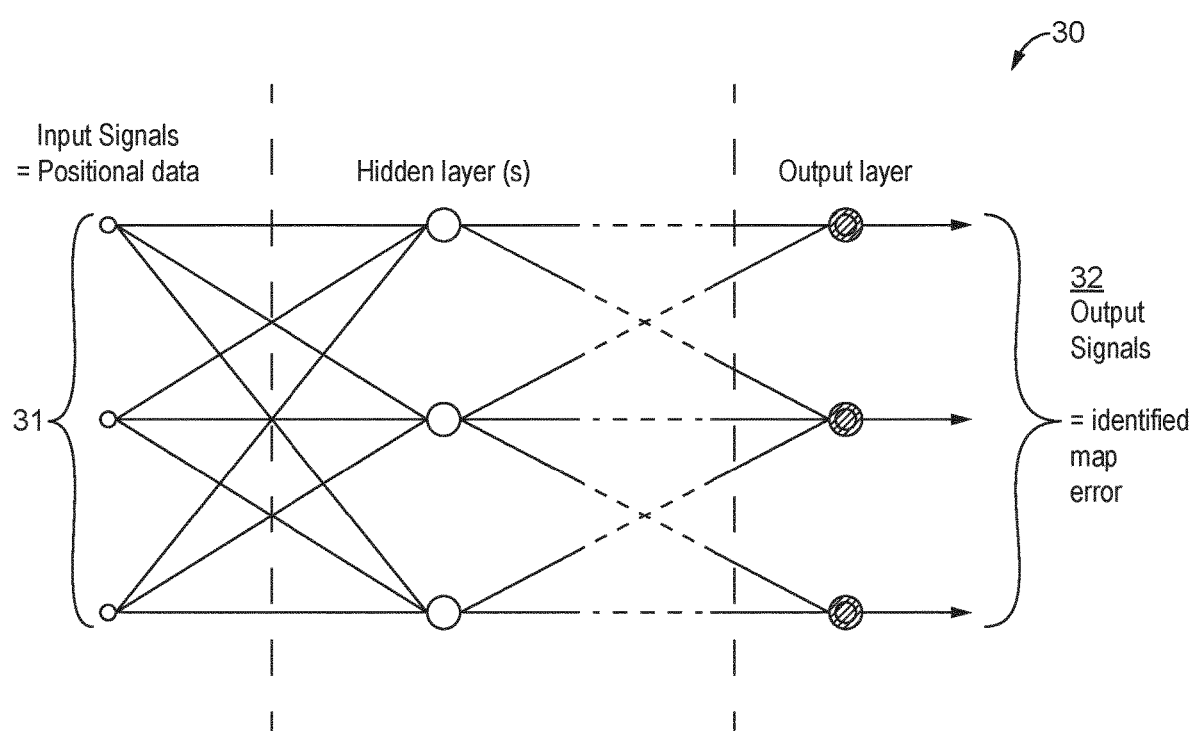
FIG. 3 shows an example of a convolutional neural network that may be used in embodiments of the present invention for processing the obtained positional data to identify map errors/inconsistencies.

FIG. 3 shows an example of a neural network 30. As shown, the neural network comprises an input layer that receives a plurality of input signals 31 in the form of the positional data obtained from the navigation devices 10. The input layer may comprise any number of processing nodes which receive the input signals and pass those on to the next layer of the neural network. The next layer shown in FIG. 3 is a convolutional layer again comprising a plurality of processing nodes. The processing nodes in the convolutional layer receive input from each of the nodes of the input layer, with different weightings, and then perform some operation on these inputs to generate an output.

Although only a single convolutional layer is shown in FIG. 3, it will be appreciated that in practice there may be many such layers, with the output(s) from each layer being provided as input to the next layer, until ultimately the output is provided to a final output layer which generates a number of output signals 32 which comprise information identifying (or classifying) possible map errors/inconsistencies. The output signals 32 can thus be used to generate the supplemental map information that is then to be provided back to the navigation devices 10.

Each edge of the neural network 30 has a corresponding weight, and each node performs a function based on its incoming edges, with the result of that function then being provided along its outgoing edge to another node, and so on. For instance, nodes are typically grouped into an input layer, one or more (hidden) intermediate layers, and an output layer, with the outputs from the nodes from each layer being provided as input to the nodes for the next layer, in order to generate an output. The edge weights are determined by training the network.

For instance, the neural network 30 may be trained in a supervised manner by providing a set of training data consisting of historic positional data for the navigable network and a current (or prior) version of the electronic map (which it can be assumed is relatively accurate since in most cases there will be relatively few errors) as 'ground truth'. The historical positional data can thus be used as input, with the current version of the electronic map then being used to train the output of the classifier (neural network 30) accordingly, e.g. to identify how the user behaviour should look for particular types of junctions, and at particular points within the navigable network. During the training process, the weights for each edge in the neural network 30 are thus iteratively adjusted in order to generate an output that closely matches the actual expected output (i.e. based on the version of the map that is used to provide the ground truth) for given input positional data.

Figure 4:
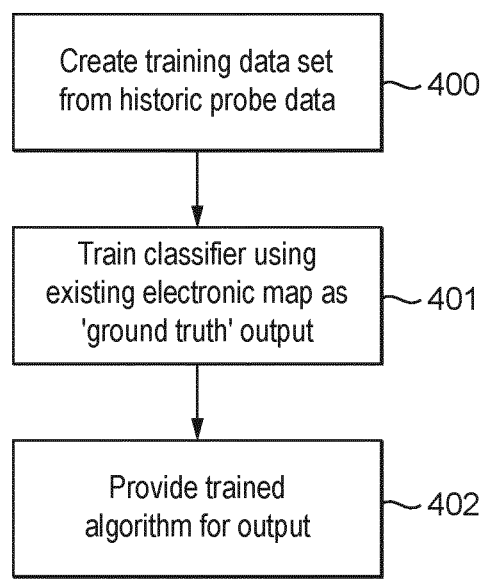
FIG. 4 is a flowchart illustrating the training of a classification algorithm according to an embodiment of the invention.

FIG. 4 is a flowchart showing how such an algorithm may be trained. In particular, in a first step (step 400), a training set is generated having input data in the form of historic positional data for the region covered by the electronic map. The neural network is then trained using the electronic map as ground truth (step 401). That is, the edge weightings are iteratively adjusted until the output signals match the desired output for a given input, with the desired outputs being determined based on the current data stored in the map. Once the algorithm has been suitably trained, it can then be provided for output (step 402) for use in identifying possible map errors/inconsistencies based on future positional data. For instance, once the algorithm has been suitably trained, live positional data may then be provided as input to the algorithm, with the algorithm then identifying based on the input positional data, as well as the current version of the map, any instances where the observed behaviour (i.e. the live positional data) does not match the expected behaviour based on the map.

The neural network 30 may thus be trained using historical probe data in combination with the electronic map. In this way, the neural network 30 may inherently learn the expected driver behaviour, and incentives, throughout the navigable network 16. The neural network 30 after it has been trained is thus then able to process input positional data to identify any potential inconsistencies with the expected behaviour, and provide the locations of such inconsistencies for output, e.g. as supplemental map information for use in the manner described herein.

Preferably, the training of the algorithm is supervised as described above. However, it would also be possible to use unsupervised training, using only the obtained probe data as input without providing any desired outputs to the algorithm. Other arrangements would of course also be possible. For instance, rather than using a suitably trained classification algorithm, a relatively simpler probabilistic metric may be used, e.g. wherein a count is made of the number of devices performing a certain manoeuvre and this is compared to a threshold based on the expected likelihood of devices to perform that manoeuvre.

Once the possible map errors/inconsistencies have been identified, this supplemental map information can then be provided for output to a navigation device for use thereby in order to provide navigation guidance. Alternatively, the supplemental map information may simply be provided to the map service provider, e.g. to facilitate focussing of mapping resource towards locations where possible errors/inconsistencies have been identified. Various other arrangements would of course be possible.

Figure 5:
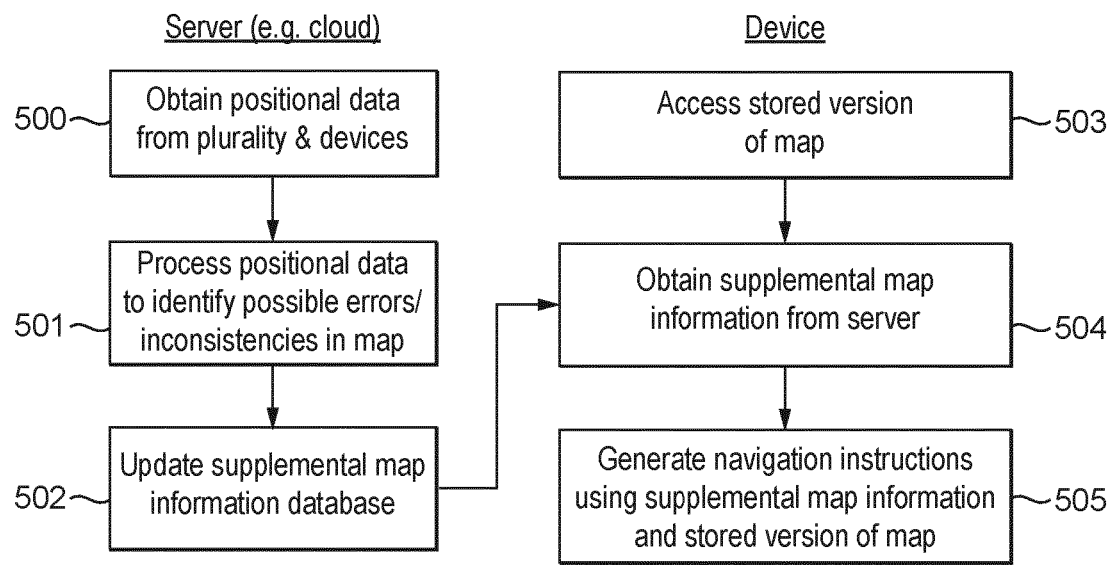
FIG. 5 is a flowchart illustrating how a navigation device may generate navigation instructions according to an embodiment of the invention.

Thus, FIG. 5 is a flowchart illustrating a method according to embodiments of the present invention. As shown, a server obtains positional information from a plurality of navigation devices (step 500), and then processes this positional information to identify errors within the map (step 501). This information is then added into the supplemental map information 18 (step 502).

The navigation device 10 when generating navigation instructions then accesses its stored version of the map (step 503) (either from local storage on the device, or from the map database 14), and obtains the supplemental map information from the server (step 504). The supplemental map information can then be fed into the navigation guidance module of the device, e.g. as input for a route planning algorithm, and used together with the stored version of the map to generate one or more navigation instructions (step 505).

Figure 6B:
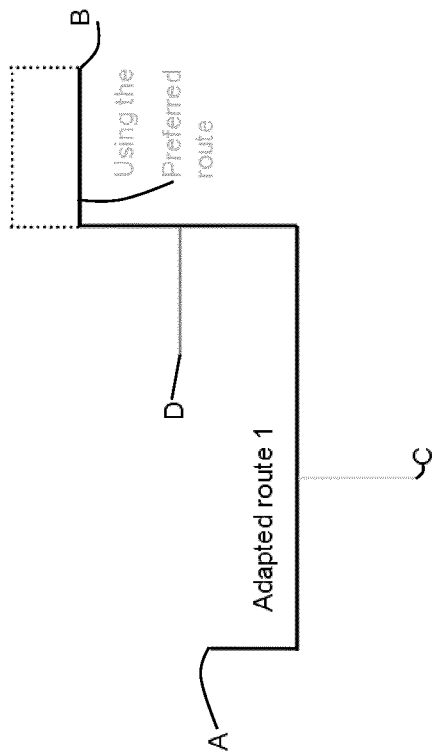
FIGS. 6A and 6B illustrate a further example of the method according to an aspect.
Figure 6A:
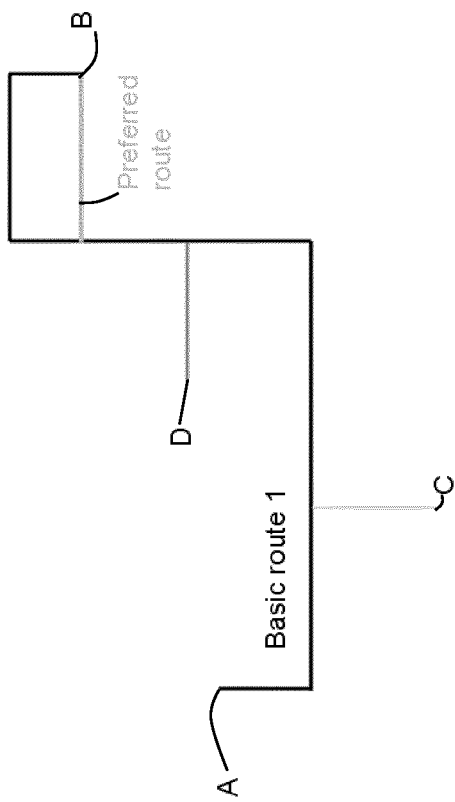

According to another aspect one or more locations may be identified as potential inconsistent in the map where an observed behaviour of devices travelling around. This may be caused by a user's preference for a route that differs from the preferred route. An example is shown in FIGS. 6A and 6B. A user may be on his way from A to B, from C to B or from D to B. Instead of taking a route indicated in FIG. 6B with a dotted line, the user may, for instance based on personal preference, take another route, i.e. a preferred route which the one indicated with the solid line. In case such a preference of such a deviation is observed, the navigation guidance may provide priority of the deviation over any earlier route. The preferred route, in this example is located close to B. Another option is to take the deviation only into account after confirmation of the user that the deviation has his personal preference.

Figures 7A, 7B:
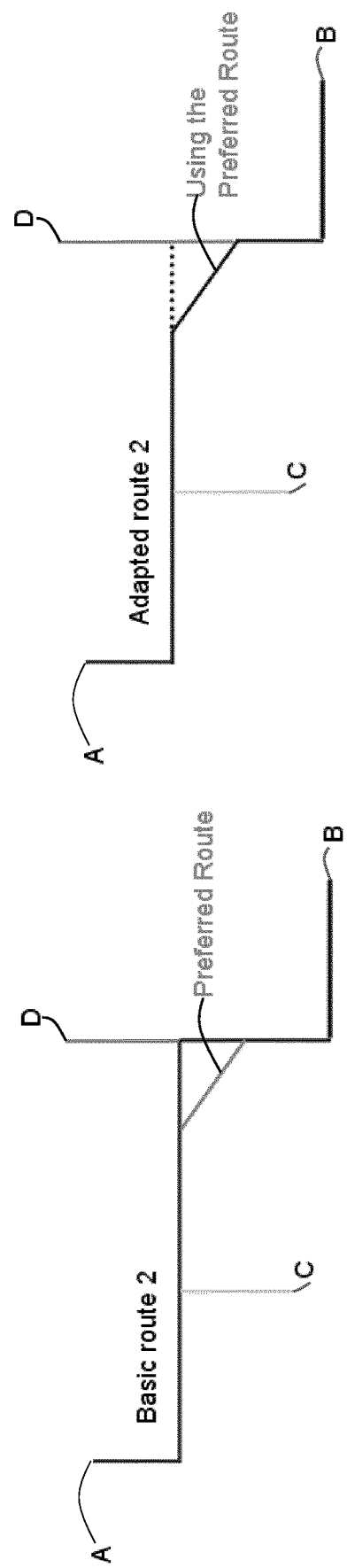
FIGS. 7A and 7B illustrate yet a further example of the method.

Another aspect in is shown in FIGS. 7A and 7B. However, in this example, the preferred route has use, especially if the user is on his way from A to B or from C to B. In case the user is on his way from D to B, he is unlikely to have use for the route indicated by the dotted line. In this example the deviating preferred route is somewhere along the route and not particularly close to the destination B.

By taking into account preferences in the manner as illustrated using FIGS. 6A, 6B, 7A and 7B digital maps can be updated real time using user data.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Also, whilst embodiments have been described with reference to a PND, it will be appreciated that in embodiments the device may comprise at least part of an advanced driver assist system (ADAS) or an autonomous driving module that is using an electronic map (and according to the technology described herein may supplement the electronic map with the data inferred from the user behaviour, e.g. in the manner described above).

Thus, it will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Embodiments of the invention can be implemented as a computer program product for use with a computer system, the computer program product being, for example, a series of computer instructions stored on a tangible data recording medium, or embodied in a computer data signal. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for providing navigation guidance for a device travelling within a navigable network represented by an electronic map, the method comprising:

obtaining at a server positional data relating to a movement over time of a plurality of devices traveling in the navigable network;

processing the obtained positional data at the server with reference to the electronic map in order to identify potential inconsistencies in the electronic map in a form of one or more locations within the navigable network where an observed behavior of devices travelling in the navigable network as indicated by the obtained positional data is not consistent with a behavior that would be expected based on the electronic map, the identifying including identifying potential inconsistencies associated with one or more of the devices deviating from the behavior that would be expected based on the electronic map due to one or more local driving preferences;

providing supplemental map information indicative of some or all of the potential inconsistencies identified in the electronic map for output to a navigation device; and the navigation device then using the provided supplemental map information along with its current version of the electronic map when generating a set of navigation instructions for guiding the device through the navigable network.

2. The method of claim 1, wherein the supplemental map information is stored and/or provided to the navigation device separately from the electronic map.

3. The method of claim 1, wherein the navigation device has access to a map, the electronic map optionally being stored locally on the navigation device, the method comprising the navigation device accessing the electronic map from map storage and obtaining the supplemental map information from the server.

4. The method of claim 1, wherein processing the obtained positional data with reference to the electronic map comprises:

providing the obtained positional data as input to a classification algorithm that has been trained using historic positional data for devices moving throughout the navigable network and the electronic map to be able to identify inconsistences in the electronic map where an observed behavior of devices traveling in the navigable network as indicated by the input positional data is not consistent with a behavior that would be expected based on the electronic map; and receiving as output from the classification algorithm an identification of potential inconsistencies in the electronic map.

5. The method of claim 4, wherein the classification algorithm comprises a neural network.

6. The method of claim 4, further comprising generating and/or updating the classification algorithm, the generating and/or updating the classification algorithm comprising providing training data in the form of a set of historic positional data obtained for devices moving throughout the navigable network, and training the classification algorithm using the historic positional data as input and using the electronic map as ground truth.

7. The method of claim 1, wherein the local driving preferences reflect a plurality of driver's preferences for performing a given driving behavior while traveling the navigable network, the given driving behavior not being caused by either a physical driving restriction or a legal driving restriction.

8. The method of claim 1, wherein the local driving preferences are preferences for avoiding at least one driving behavior, the at least one driving behavior being performed by few or no drivers due to an undesirability of performing the at least one driving behavior for the drivers.

9. The method of claim 8, wherein the undesirability of the driving behavior is not based on either a physical driving restriction or a legal driving restriction.

10. The method of claim 8, wherein the at least one driving behavior includes a driving maneuver that is considered by some or all drivers to be difficult.

11. A method of identifying potential inconsistencies within an electronic map representation of a network of navigable elements within a geographic area, the method comprising:

obtaining at a server positional data relating to a movement over time of a plurality of devices traveling in the navigable network;

processing the obtained positional data at the server with reference to the electronic map representing the navigable network in order to identify potential inconsistencies in the electronic map in a form of one or more locations within the navigable network where an observed behavior of devices traveling in the navigable network as indicated by the obtained positional data is not consistent with a behavior that would be expected based on the electronic map, the identifying including identifying potential inconsistencies associated with one or more of the devices deviating from the behavior that would be expected based on the electronic map due to one or more local driving preferences.

12. The method of claim 11, wherein processing the obtained positional data with reference to the electronic map comprises:

providing the obtained positional data as input to a classification algorithm that has been trained using historic positional data for devices moving throughout the navigable network and the electronic map to be able to identify inconsistences between the electronic map and observed behavior of devices travelling through the navigable network as indicated by the input positional data; and receiving as output from the classification algorithm an identification of potential inconsistencies in the electronic map.

13. The method of claim 12, wherein the classification algorithm comprises a neural network.

14. The method of claim 12, further comprising:

generating and/or updating the classification algorithm, the generating and/or updating the classification algorithm comprising providing training data in the form of a set of historic positional data obtained for devices moving throughout the navigable network, and training the classification algorithm using the historic positional data as input and using the electronic map as ground truth.

15. A method of generating and/or updating a classification algorithm, the method comprising:

providing training data in the form of a set of historic positional data obtained for devices moving throughout the navigable network; and training the classification algorithm, using the historic positional data as input and using the electronic map as ground truth, to identify inconsistencies in the electronic map in a form of one or more locations within the navigable network where an observed behavior of devices travelling in the navigable network as indicated by the historic positional data is not consistent with a behavior that would be expected based on the electronic map, the identifying including identifying inconsistencies associated with one or more of the devices deviating from the behavior that would be expected based on the electronic map due to one or more local driving preferences.

16. A method of generating navigation instructions for a device travelling within a navigable network represented by an electronic map, the method comprising:
accessing a stored version of the electronic map representing the navigable network;
obtaining from a server supplemental map information indicative of one or more locations within the navigable network where it has been determined that an observed behavior of devices traveling in the navigable network is not consistent with a behavior that would be expected based on the electronic map, the one or more locations including at least one location associated with the behavior of one or more devices deviating from the behavior that would be expected based on the electronic map due to one or more local driving preferences; and
using the obtained supplemental map information when generating one or more navigation instructions for the device.

17. The method of claim 16, wherein generating the one or more navigation instructions for the device includes:
acquiring information about the at least one location associated with one or more devices behavior deviating from the behavior that would be expected based on the electronic map due to one or more local driving preferences; and
using the information avoid generating navigation instructions to perform the behavior that would be expected based on the electronic map.

18. A system configured to provide navigation guidance to a navigation device travelling within a navigable network represented by an electronic map, the system comprising:
a server configured to:
obtain positional data relating to a movement over time of a plurality of devices traveling in the navigable network;
process the obtained positional data with reference to the electronic map in order to identify inconsistencies in the electronic map in a form of one or more locations within the navigable network where an expected behavior of devices traveling in the navigable network according to the electronic map is not consistent with an observed behavior as indicated by the obtained positional data, the identifying including identifying inconsistencies associated with one or more devices deviating from a behavior that would be expected based on the electronic map due to one or more local driving preferences; and
provide supplemental map information indicative of inconsistencies identified in the electronic map for output to the navigation device; and
the navigation device configured to:
obtain the supplemental map information from the server; and
use the supplemental map information along with a current version of the electronic map when generating a set of navigation instructions to guide the device through the navigable network.

19. A server that is configured to:
obtain positional data relating to a movement over time of a plurality of devices traveling in the navigable network;
process the obtained positional data with reference to the electronic map in order to identify inconsistencies in the electronic map in a form of one or more locations within the navigable network where an expected behavior of devices traveling in the navigable network according to the electronic map is not consistent with an observed behavior as indicated by the obtained positional data within the electronic map, the identifying including identifying potential inconsistencies associated with one or more devices deviating from the behavior that would be expected based on the electronic map due to one or more local driving preferences; and
provide supplemental map information indicative of identified inconsistencies, preferably for output to a navigation device.

20. A navigation device that is configured to:
when generating navigation instructions for travelling within a navigable network represented by an electronic map,
access a stored version of the electronic map representing the navigable network;
obtain from a server supplemental map information indicative of one or more locations within the navigable network where an observed behavior of devices traveling in the navigable network is has been determined to be inconsistent with a behavior that would be expected based on the electronic map, the one or more locations including at least one location associated with the behavior of one or more devices deviating from the behavior that would be expected based on the electronic map due to one or more local driving preferences; and
use the obtained supplemental map information along with the stored version of the electronic map when generating one or more navigation instructions.

* * * * *